United States Patent Office 3,073,755
Patented Jan. 15, 1963

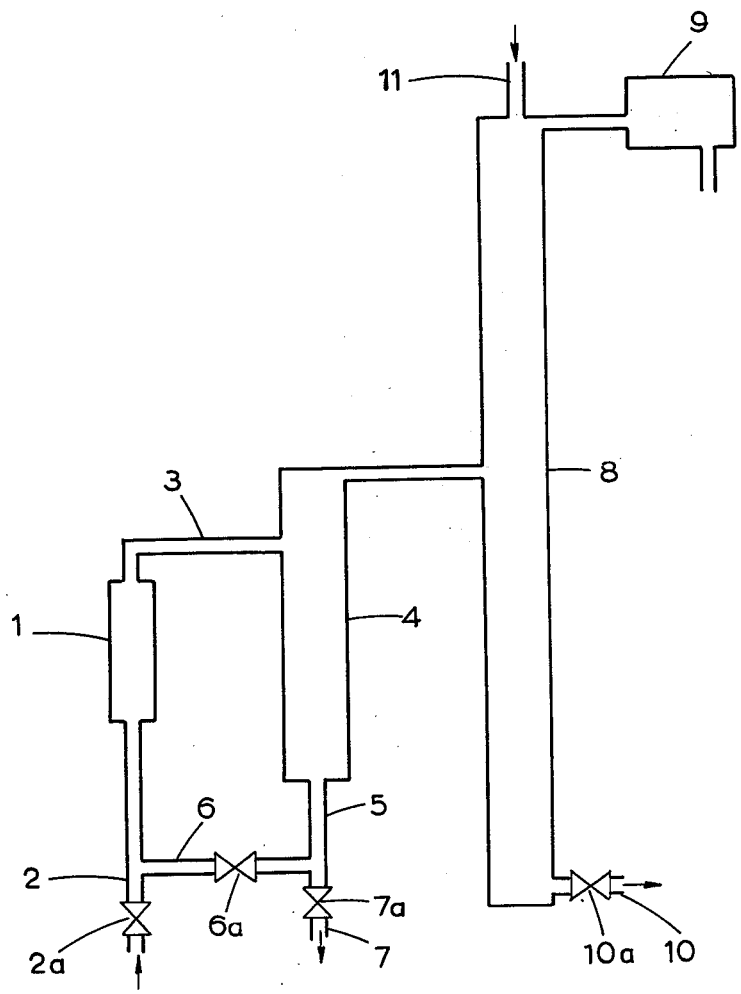

3,073,755
CONCENTRATION OF HYDROGEN PEROXIDE
Reginald Henry Banfield, Luton, and Anthony MacDonald Hildon, Dunstable, England, assignors to Laporte Chemicals Limited, Luton, England, a British company
Filed Aug. 5, 1960, Ser. No. 47,806
Claims priority, application Great Britain Aug. 11, 1959
4 Claims. (Cl. 202—57)

This invention relates to the concentration of aqueous hydrogen peroxide and, more particularly, to the concentration of aqueous hydrogen peroxide by fractional distillation in an aluminium column, the hydrogen peroxide containing impurities which may be either organic, inorganic or both.

Hydrogen peroxide has for a long time been made by a process involving the electrolytic production of persulphuric acid and persalts and their subsequent decomposition by hydrolysis, the hydrogen peroxide being separated from the hydrolysed solution by distillation, preferably under vacuum. More recently, a process has been introduced for the commercial production of hydrogen peroxide by alternate hydrogenation and oxidation of substituted anthraquinones. The hydrogenation of an alkylated anthraquinone in a solvent by means of hydrogen in the presence of a catalyst produces the corresponding alkylated anthraquinol or anthraquinhydrone which, after separation from the catalyst, is oxidised with oxygen to produce hydrogen peroxide with regeneration of the alkylated anthraquinone. This process may be made cyclic by recycling the alkylated anthraquinone to the hydrogenation stage after the removal of the hydrogen peroxide by aqueous extraction.

The strength of the aqueous hydrogen peroxide obtained by the water extraction depends upon many factors but in any event normally requires concentration if strengths above 25% w./w. $H_2O_2$ are required. In normal commercial operation using 2-ethylanthraquinone the strength of the aqueous solution is often 18% w./w. $H_2O_2$.

Concentration by fractional distillation requires, according to known techniques, the vaporisation of the low strength hydrogen peroxide and the feeding of the vapours obtained to a frictionating column. By the action of such a column, water vapour, low in hydrogen peroxide content with respect to the hydrogen peroxide content of the feed, leaves at the upper end of the column, whilst aqueous hydrogen peroxide, rich in hydrogen peroxide content with respect to the hydrogen peroxide content of the feed, leaves at the lower end of the column. In such columns it is usual to introduce, in known manner, a supply of water as reflux.

Similarly, hydrogen peroxide solution derived from the above-mentioned electrolytic process has been so concentrated.

In the past such fractionating columns have been constructed of stoneware, the advantage of which is its extreme resistance to attack by any impurities contained in the lower strength hydrogen peroxide solution fed to the column. However, stoneware columns are extremely heavy, difficult to produce and liable to fracture. Thus an alternative material was sought and high purity aluminium has been suggested as a suitable material. This has many advantages in that it is light and relatively easily worked. The term "high purity aluminium" as used herein means material containing at least 99.5% of aluminium by weight. However, the impurities contained in aqueous solutions of hydrogen peroxide derived from both the electrolytic and anthraquinone processes make a general attack upon the surface of the still, resulting in shortened plant like and lowered distillation efficiency, and furthermore, causes appreciable quantities of aluminium to appear in the final product. This is often extremely undesirable in that, for instance, it increases the turbidity, and decreases the stability of the product due to associated traces of iron and copper. Furthermore the dissolved aluminium will often deposit in another unit of the plant with serious consequences.

It is an object of this invention to provide means whereby the attack heretofore mentioned is eliminated or substantially reduced.

According to this invention a process is provided for the concentration of aqueous hydrogen peroxide by fractional distillation in a high purity aluminium column wherein reflux water is added at or near the top of the fractionating column and wherein phosphate ions are present in the reflux water at a concentration of between 10 and 300 p.p.m.

Preferably, phosphate ions are initially present in the reflux water in a concentration of at least 200 p.p.m. with respect to the reflux water but subsequently the concentration thereof may be lowered to not less than 10 p.p.m.

Preferably the phosphate is added in the form of pyrophosphate such as the sodium salt.

Most preferably acid sodium pyrophosphate $$(Na_2H_2P_2O_7)$$

is used. Typical of other suitable salts are potassium pyrophosphate and the salts $M_3HP_2O_7$ and $MH_3P_2O_7$ where M is sodium, potassium or lithium. $Na_4P_2O_7$ can be used but gives rise to an increase in pH which will not be found desirable in all cases.

It will be understood that sufficient reflux water must be added to the fractionating column. The basic relationship is that the total number of moles ($H_2O+H_2O_2$) issuing from the bottom of the column is the same as the number of moles of water entering as reflux. For example, if 18% w./w. $H_2O_2$ is fed to a fractionating column producing 66% w./w. with a purge rate of 5% of the feed $H_2O_2$, an overhead loss of 0.3% and a decomposition of 2.5%, then for every gallon of feed, about 0.2 gallon of reflux water is required.

The invention will now be further described by way of example with reference to the accompanying drawing.

Referring to the drawing, the crude hydrogen peroxide is fed into the vaporiser 1 through pipe 2 controlled by valve 2a and thence passes by pipe 3 to the entrainment separator 4, wherein most of the non-volatile impurities are removed, the entrained liquid being recycled through pipes 5, 6 (controlled by valve 6a) and 2 to the vaporiser 1 and purged from time to time by removing solution through pipe 7 controlled by valve 7a to keep the impurity content low. The water and hydrogen peroxide vapours are passed from the entrainment separator 4 and introduced into an intermediate zone of the fractionating column 8. The rising vapours become depleted in hydrogen peroxide and the resulting overflow from the column is essentially hydrogen peroxide-free water vapour. The falling stream of water becomes progressively richer in hydrogen peroxide and conditions are regulated so that the bottom product from the column which leaves through pipe 10 gives hydrogen peroxide of the required strength.

The overflow from the column is passed into a condenser 9 and reflux water is introduced into the top of the column through pipe 11, the phosphate ions being present in this reflux.

Although, as will be seen hereinafter, the experimental results of adding the phosphate in to the reflux water undisputedly indicate that it protects the aluminium surfaces of the still from corrosion it is not certain how the protection is effected. It might possibly be effected by the formation of a protective "phosphate" coating or skin on the surface of the aluminium.

The effects of the addition on various factors both of distillation process and product will be seen from the following tables:

TABLE 1

*Effect of Adding Acid Sodium Pyrophosphate to the Reflux Water on the Distillation Efficiency*

| Grams per litre acid sodium pyrophosphate ($Na_2H_2P_2O_7$) | Distillation efficiency measured in terms of percent of hydrogen peroxide recovered in the product |
|---|---|
| nil | 94.7, 94.9, 94.5, 94.8, 94.8, 94.4, Av.=94.7. |
| 0.1 | 95.3, 95.1, 95.0, 95.3, 95.1, 95.3, Av.=95.2. |
| 0.2 | 95.0, 95.3, 95.2, 95.3, 95.2, 95.4, Av.=95.2. |

This is a significant and valuable increase in plant efficiency.

TABLE 2

*Effect of Adding Acid Sodium Pyrophosphate to the Reflux Water on the Total Amount of Stabiliser (Acid Sodium Pyrophosphate) Required to Stabilize the Product*

| Experiment | Amount of acid sodium pyrophosphate ($Na_2H_2P_2O_7$) added to the reflux water | Amount of extra acid sodium pyrophosphate required to reduce the decomposition rate to 0.12 to 0.15 ml./min. per 25 ml. sample at 100° C. | Total acid sodium pyrophosphate in sample |
|---|---|---|---|
| | G./l. | G./l. | G./l. |
| 1 | 0.1 | nil | 0.1 |
| 2 | 0.1 | nil | 0.1 |
| 3 | nil | ¹ 0.4 | 0.4 |
| 4 | nil | ¹ 0.4 | 0.4 |

¹ These quantities reduced the decomposition rate to just below the upper limit.

This is a useful improvement as the solids content of the product is considerably reduced.

TABLE 3

*Effect of Adding Acid Sodium Pyrophosphate to the Reflux Water on the Rate of Decomposition of the Product*

[In both cases acid sodium pyrophosphate was added to the product to bring the final concentration up to 0.25 gram/litre. The figures quoted are rates of decomposition expressed as ml./min. of oxygen evolved from a 25 ml. sample at 100° C.]

| No addition of acid sodium pyrophosphate to reflux water | 0.1 gram/litre sodium pyrophosphate added to reflux water |
|---|---|
| 0.58 | 0.19 |
| 0.30 | 0.15 |
| 0.29 | 0.19 |
| 0.29 | 0.15 |
| 0.25 | |
| 0.28 | |
| Average 0.33 | Average 0.17 |

This is a very significant reduction in the rate of decomposition.

TABLE 4

*Effect of Adding Acid Sodium Pyrophosphate to the Reflux Water on the Amount of Aluminium in the Product*

| Time in days | Amount of $Na_2H_2P_2O_7$ added, g./l. | Aluminium in the product, mg./l. |
|---|---|---|
| 1 | nil | 5.3 |
| 4 | nil | 14.1 |
| 5 | 0.2 | 5.4 |
| 6 | 0.2 | 1.3 |
| 7 | 0.2 | 1.2 |
| 19 to 40 | 0.1 | 0.8 to 1.0 |
| 47 | 0.1 | 0.8 |
| 49 | nil | 4.9 |
| 50 | nil | 16.6 |
| 51 | nil | 28.4 |
| 52 | nil | 24.8 |
| 53 | nil | 24.6 |

It will be seen that at the time of the first two tests, no pyrophosphate had been added to the reflux and the aluminium content of the product was high. Between the 4th and 5th day pyrophosphate addition to the reflux was started, and by the 7th day the concentration of the aluminium had dropped appreciably.

After the 47th day the addition of pyrophosphate to the reflux was discontinued; the aluminium content of the product rose sharply.

It will further be seen from the table that once the desired protective effect has been achieved the quantity of pyrophosphate required thereafter to inhibit attack on the aluminium surfaces was much smaller (cf. the 40th day), though if this small quantity was stopped appreciable attack took place (cf. 49th and subsequent days).

TABLE 5

*Effect of Adding Acid Sodium Pyrophosphate to the Reflux Water on the Rate of Corrosion of Aluminium*

[Samples of aluminium were placed in the effluent from the fractionating column of two distillation units operating under identical conditions except than in one unit acid sodium pyrophosphate was added to the reflux water. The rate of corrosion is expressed as milligrams of aluminium dissolved per square decimeter per day (MD²D)]

| Time in Days | Loss of Aluminium MD²D | |
|---|---|---|
| | 0.1 g./l. $Na_2H_2P_2O_7$ added to reflux | No. additions to reflux |
| 0 to 8 | 6.2 | 27.6 |
| 8 to 12 | 8.4 | 25.2 |
| 12 to 16 | 9.2 | 27.1 |
| 16 to 20 | 4.8 | 26.0 |
| 20 to 24 | 5.4 | 19.8 |

Thus the rate of corrosion in the presence of acid sodium pyrophosphate is reduced by a factor of 3 to 5. This is a very substantial reduction and are of great importance since corrosion of aluminium effects stability because iron is present to the extent of about 0.2% in 99.5% purity aluminium, and iron ions are very catalytic towards hydrogen peroxide decomposition.

TABLE 6

*Effect of Adding Acid Sodium Pyrophosphate to the Reflux on the Clarity of the Product*

(a)

| Day added | $Na_2H_2P_2O_7$, g./l. | Appearance of product |
|---|---|---|
| 1 | 0 | Hazy. |
| 4 | 0 | Hazy. |
| 5 | 0.2 | Hazy. |
| 6 | 0.2 | Fairly clear. |
| 7 | 0.1 | Almost clear. |
| 19 | 0.1 | Bright. |

(b)

In the second experiment the clarity is expressed quantitatively in cms., being the length of a trace on a cathode ray (C.R.) tube.

| Day | Na₂H₂P₂O₇ added, g./l. | Clarity (Length of trace CR tube) |
|---|---|---|
| 1 | 0.1 | 3.3 |
| 8 | 0.1 | 2.1 |
| 10 | 0 | 5.3 |
| 14 | 0 | >11.0 |

In connection with Table 6, it should be noted that a reference solution, being a 40 g./litre solution of a standard sample of polystyrene (clear granules) in benzone, gave a reading of 3.2 cms. The standard selected is quite arbitary but reproductible. The method of measuring was as follows:

The solution was placed in a rectangular optical cell and inserted in the cell-holder in a beam of light which converged to a focus just beyond the cell. Light scattered at right angles was received through a microscope objective the function of which was to direct the light scattered from a small segment of the illuminated field on to the cathode of a photomultiplier valve. The current so produced was converted to a wave form and measured as a linear trace on a cathode ray tube. The combination of microscope objective and cathode ray tube enabled the scattering due to the haze to be separated from that due to passing oxygen bubbles which resulted from decomposition of the hydrogen peroxide.

What we claim is:

1. In the process of fractionating a vapour mixture of hydrogen peroxide vapour and water vapour, the improvement which comprises introducing said mixture into a column constructed of aluminum metal containing at least 99.5 percent aluminum by weight, condensing a portion of the vapour, withdrawing condensed hydrogen peroxide vapour from the lower portion of the column and withdrawing water vapour from an upper portion of the column, and introducing into the upper portion of the column an aqueous solution of pyrophosphate salt which will supply pyrophosphate ions in a concentration of 10 to 300 p.p.m.

2. A process as claimed in claim 1 wherein the pyrophosphate ions are initially present in the reflux water in a concentration of at least 200 p.p.m.

3. A process as clamed in claim 1 wherein the pyrophosphate ions are produced by the addition of acid sodium pyrophosphate ($Na_2H_2P_2O_7$).

4. In the process of fractionating a vapour mixture of hydrogen peroxide vapour and water vapour, the improvement which comprises introducing said mixture into a column constructed of aluminum metal containing at least 99.5 percent aluminum by weight, condensing a portion of the vapour, withdrawing material comprising condensed hydrogen peroxide vapour from the lower portion of the column and withdrawing water vapour from an upper portion of the column, introducing into the upper portion of the column an aqueous solution of pyrophosphate salt which will supply pyrophosphate ions at a concentration of between 10 and 300 p.p.m., the amount of aqueous solution introduced to the upper portion of the column having the same number of moles as the number of moles of material withdrawn from the lower portion of said column.

References Cited in the file of this patent
UNITED STATES PATENTS

| | | |
|---|---|---|
| 2,219,294 | Bretschger | Oct. 29, 1940 |
| 2,520,870 | Wood et al. | Aug. 29, 1950 |
| 2,818,372 | Hood et al. | Dec. 31, 1957 |
| 2,819,949 | Keeler et al. | Jan. 14, 1958 |
| 2,990,341 | Graybill | June 27, 1961 |